United States Patent
Chuang (10) Patent No.: US 9,648,487 B2
(45) Date of Patent: May 9, 2017

(54) METHOD AND DEVICE FOR GROUPING USER EQUIPMENTS IN PROXIMITY SERVICES RESTRICTED DISCOVERY

(71) Applicant: Acer Incorporated, New Taipei (TW)

(72) Inventor: Ming-Dao Chuang, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 14/986,095

(22) Filed: Dec. 31, 2015

(65) Prior Publication Data

US 2016/0198332 A1 Jul. 7, 2016

Related U.S. Application Data

(60) Provisional application No. 62/100,152, filed on Jan. 6, 2015.

(30) Foreign Application Priority Data

Jul. 2, 2015 (TW) .............................. 104121443 A (51) Int. Cl.
*H04M 1/66* (2006.01)
*H04W 8/00* (2009.01)
*H04W 4/08* (2009.01)
*H04W 12/08* (2009.01)

(52) U.S. Cl.
CPC ............ *H04W 8/005* (2013.01); *H04W 4/08* (2013.01); *H04W 12/08* (2013.01)

(58) Field of Classification Search
USPC ........................................................ 455/411
See application file for complete search history.

(56) References Cited

U.S. PATENT DOCUMENTS

| 2014/0010172 A1 | 1/2014 | Wei et al. |
| 2014/0344578 A1 | 11/2014 | Kim et al. |
| 2016/0007185 A1 | 1/2016 | Zhu et al. |

FOREIGN PATENT DOCUMENTS

| CN | 104066070 | 9/2014 |
| EP | 2 806 670 | 11/2014 |
| TW | 201404235 | 1/2014 |
| WO | WO 2013/169974 | 11/2013 |
| WO | WO 2014/068524 | 5/2014 |
| WO | WO 2014/208034 | 12/2014 |

OTHER PUBLICATIONS

European Search Report dated Mar. 24, 2016, issued in application No. 16150204.2.

(Continued)

*Primary Examiner* — Joel Ajayi
(74) *Attorney, Agent, or Firm* — McClure, Qualey & Rodack, LLP (57) ABSTRACT

A method for grouping user equipments (UEs) in proximity services restricted discovery, used in a communications system, including: broadcasting, by a first user equipment (UE), a UE discovered signal for being discovered, wherein the UE discovered signal includes a first group code corresponding to the first UE; receiving, by a second UE, the UE discovered signal and comparing the first group code with a second group code corresponding to the second UE; and transmitting, by the second UE, a comparing report to a network when the first group code and the second group code are the same.

10 Claims, 9 Drawing Sheets (56) References Cited

OTHER PUBLICATIONS

Chinese language office action dated May 16, 2016, issued in application No. TW 104121443.
"3rd Generation Partnership Project; Technical Specification Group Services and System Aspects; Proximity-based services (ProSe); Stage 2 (Release 12);" Dec. 2014; pp. 1-62.
"Discussion about ProSe Restrictied Discovery;" 3GPP TSG CT WG1 Meeting #90; Feb. 2015; pp. 1.

METHOD AND DEVICE FOR GROUPING USER EQUIPMENTS IN PROXIMITY SERVICES RESTRICTED DISCOVERY

CROSS REFERENCE TO RELATED APPLICATIONS

This Application claims priority to U.S. Application No. 62/100,152, filed on Jan. 6, 2015, and Taiwan Patent Application No. 104121443, filed on Jul. 2, 2015. The content of the above applications are incorporated by reference in their entirety.

BACKGROUND OF THE INVENTION

Field of the Invention

Aspects of the present invention relate generally to a wireless communications network, and more particularly, to a method and a communications device for grouping user equipments (UEs) in Proximity-based Services (ProSe) restricted discovery in wireless communications systems.

Description of the Related Art

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

BRIEF SUMMARY OF THE INVENTION

A detailed description is given in the following embodiments with reference to the accompanying drawings.

A method and a communications system for grouping user equipments (UEs) in proximity services restricted discovery are provided.

In a preferred embodiment, the invention is directed to a method for grouping user equipments (UEs) in proximity services restricted discovery, used in a communications system, comprising: broadcasting, by a first user equipment (UE), a UE discovered signal for being discovered, wherein the UE discovered signal includes a first group code corresponding to the first UE; receiving, by a second UE, the UE discovered signal and comparing the first group code with a second group code corresponding to the second UE; and transmitting, by the second UE, a comparing report to a network when the first group code and the second group code are the same.

In some embodiments, before broadcasting the UE discovered signal by the first UE, the method further comprises: transmitting a first discovery request to the network, wherein the first discovery request includes a group ID; and receiving a first discovery response transmitted from the network which transmits the first discovery response according to the first discovery request, wherein the first discovery response includes the first group code. In some embodiments, before receiving the UE discovered signal by the second UE, the method further comprises: transmitting a second discovery request to the network, wherein the second discovery request includes a group ID; and receiving a second discovery response transmitted from the network which transmits the second discovery response according to the second discovery request, wherein the second discovery response includes the second group code. In some embodiments, the method further comprises: receiving, by the second UE, a comparison acknowledgement (ACK) transmitted from the network; and communicating, by the second UE, with the first UE directly, wherein the comparing report includes the first group code and the second group code. In some embodiments, before transmitting the first discovery request by the first UE, the method further comprises: transmitting a first authorization request to the network; and receiving a first authorization response transmitted by the network which transmits the first authorization response according to the first authorization request, wherein the first authorization response includes the group ID. In some embodiments, before transmitting the second discovery request by the second UE, the method further comprises: transmitting a second authorization request to the network; and receiving a second authorization response transmitted by the network which transmits the second authorization response according to the second authorization request, wherein the second authorization response includes the group ID. In some embodiments, the first discovery response further includes information of a discovery type "restricted discovery".

In a preferred embodiment, the invention is directed to a communications system for grouping user equipments (UEs) in proximity services restricted discovery. The communications system comprises: a network, a first user equipment (UE), and a second UE. The first UE broadcasts a UE discovered signal for being discovered, wherein the UE discovered signal includes a first group code corresponding to the first UE. The second UE receives the UE discovered signal from the first UE, wherein the second UE compares the first group code with a second group code corresponding to the second UE, and transmits a comparing report to the network when the first group code and the second group code are the same.

In a preferred embodiment, the invention is directed to a method for grouping user equipments (UEs) in proximity services restricted discovery, used in a second UE, comprising: receiving a UE discovered signal for being discovered, wherein the UE discovered signal includes a first group code corresponding to a first UE; comparing the first group code with a second group code corresponding to the second UE; and transmitting a comparing report to a network when the first group code and the second group code are the same.

In a preferred embodiment, the invention is directed to a method for grouping user equipments (UEs) in proximity services restricted discovery, used in a first UE, comprising: broadcasting a UE discovered signal for discovering, wherein the UE discovered signal includes a first group code corresponding to the first UE.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Several exemplary embodiments of the present disclosure are described with reference to FIGS. 1 through 8, which generally relate to a method and a communications device for grouping in Proximity-based Services (ProSe) restricted discovery. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3GPP specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station.

Figure 1:
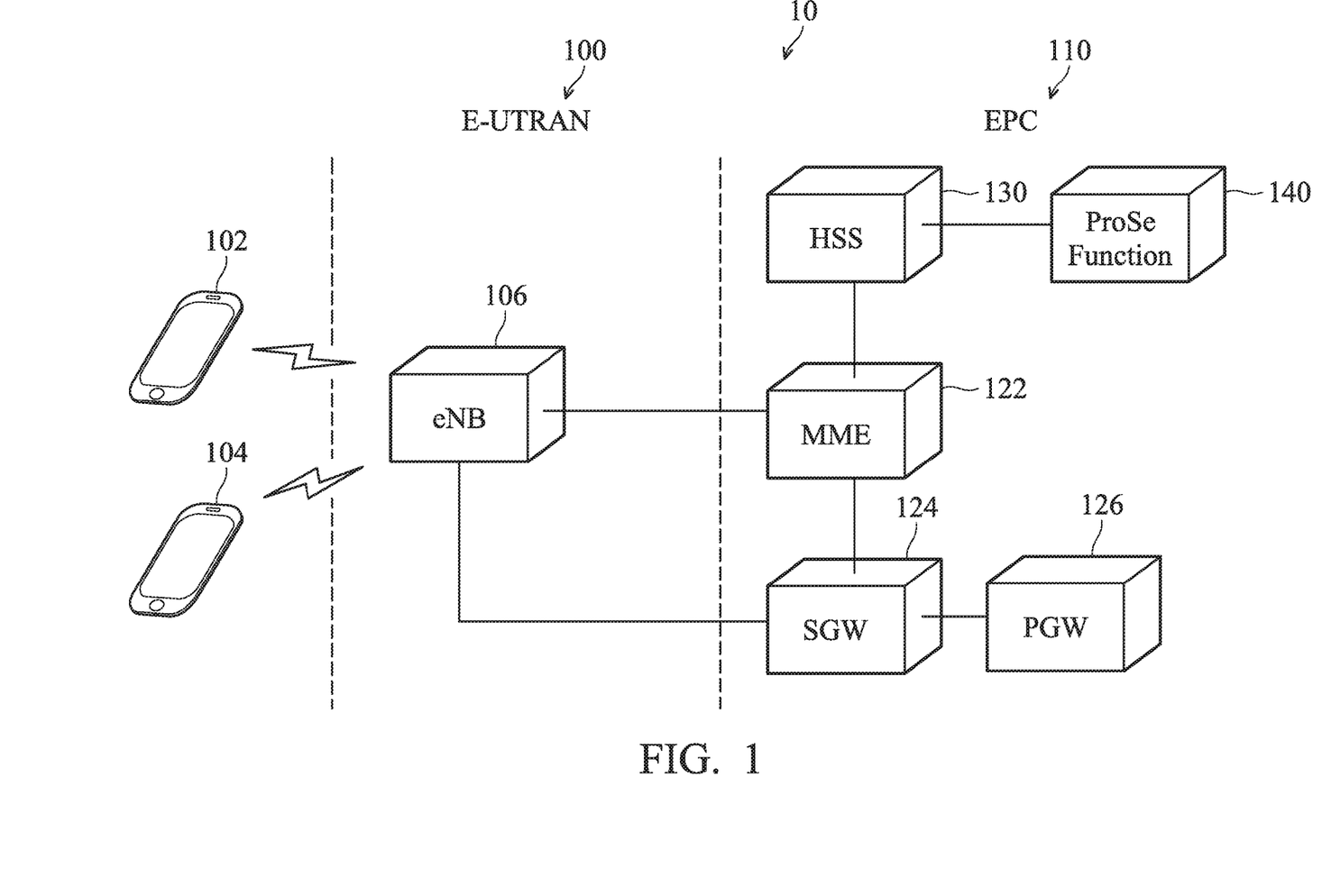
FIG. 1 illustrates an exemplary wireless communications system including a ProSe (Proximity-based Service) function according to an embodiment of the present invention.

FIG. 1 illustrates an exemplary wireless communications system 10 including a ProSe (Proximity-based Service) function 140 according to an embodiment of the present invention. The wireless communications system 10 includes a first user equipment (UE) 102, a second UE 104, an evolved UMTS terrestrial radio access network (E-UTRAN) 100 and an Evolved Packet Core (EPC) 110. It should be noted that although the number of the user equipments in FIG. 1 is two as an example, it should not be limited in the invention.

The E-UTRAN 100 may include one or more evolved Node B (eNB) 106, and the EPC 110 includes a mobility management entity (MME) 122, a serving gateway (SGW) 124, a packet data network gateway (PGW) 126, a home subscriber server (HSS) 130, and a proximity-based service (ProSe) function 140. The MME 122, the SGW 124, and the PGW 126 can be implemented in a gateway. In some embodiments, the SGW 124 and the PGW 126 can be implemented on separate network devices. In some embodiments, the SGW 124 and the PGW 126 may be implemented in different network devices.

The MME 122 manages mobility for the UEs. No user data packets go through the MME 122. The MME 122 is configured to perform authentication and authorization functions, non-access stratum (NAS) signaling, security negotiations, serving gateway and/or PGW selection, and UE reachability.

The MME 122 and the SGW 124 act as a foreign agent for a mobile IP session. The SGW 124 forwards and receives packets to and from the base station(s) where the first UE 102 or the second UE 104 is being served.

The PGW 126 acts as an interface connecting to an external packet networks (e.g., the Internet or operator's IP service center). The PGW 126 may also include a policy and charging enforcement function (PCEF). The PCEF provides service data flow detection, user plane traffic handling, triggering control plane session management, Quality of Service (QoS) handling, service data flow measurement, as well as online and offline charging interactions. The PCEF enforces the policy control as indicated by a policy control and charging rules function (PCRF).

The HSS 130 is connected to the MME 122 and is used to store a record for each subscriber to the wireless communications system 10.

The ProSe function 140 is connected to the HSS 130, and is used to authorize the first UE 102 and the second UE 104 to use the ProSe service, such as to transmit/receive data or signal directly and to use any other features provided by the ProSe function 140. For example, a ProSe service can be a ProSe communication, or a ProSe direct discover. Note that the signaling path between the ProSe function and the UE can traverse through one or more network entities. For example, if only one signaling is applied, the signaling path is via direct interface between the ProSe function and the UE; and if traversing more than one network entity, the ProSe function may have interface connecting to the MME so that the signaling path is traversed through ProSe function, MME and the eNB.

Figure 2:
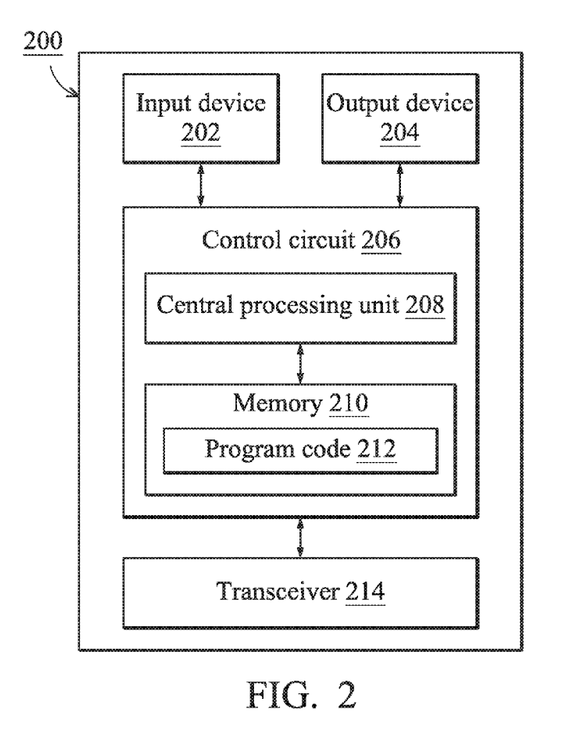
FIG. 2 shows an alternative simplified functional block diagram of a communications device according to one embodiment of the present invention.

FIG. 2 shows an alternative simplified functional block diagram of a communications device 200 according to one embodiment of the present invention. As shown in FIG. 2, the communication device 200 can be the UE 102 or 104, the eNB 106, the MME 130, or the ProSe function 140 in the wireless communications system 10 of FIG. 1, and the communications device 200 is preferably used in the LTE system, the LTE-A system or any other similar wireless communications system. The communications device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the communications device 200. The communications device 200 can receive signals input by a user through the input device 202, such as a keyboard keypad, touch screen, or microphone (for voice input), and can output images and sounds through the output device 204, such as a screen or speakers. The transceiver 214 is used to receive and transmit wireless signals, deliver received signals to the control circuit 206, and output signals generated by the control circuit 206 wirelessly.

Figure 3:
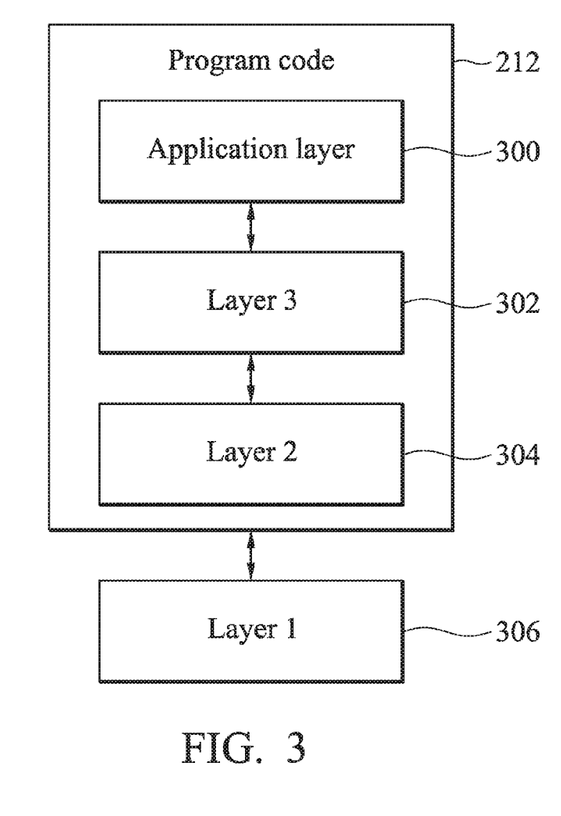
FIG. 3 is a simplified block diagram of the program code shown in FIG. 2 in accordance with one embodiment of the invention.

FIG. 3 is a simplified block diagram of the program code 212 shown in FIG. 2 in accordance with one embodiment of the invention. In this embodiment, the program code 212 includes an application layer 300, a Layer 3 302, and a Layer 2 304, and is coupled to a Layer 1 306. The application layer 300 performs signaling/data/media information exchange via user plane messages, i.e. it is required that the UE has IP connectivity with the network. For example, if user plane interface is applied between a UE and a ProSe function, the UE needs to obtain IP connectivity and then can start to communicate with ProSe function. The Layer 3 302 generally performs mobility management, e.g. the MME 122 and the UE 102 use NAS messages to exchange location information and attachment status, etc. The Layer 2 304 generally performs radio resource control and link control. The Layer 1 306 generally performs physical connections.

Several usage and potential demand about the Proximity-based Service (ProSe) technique is described in detail in 3GPP TR22.803 and 3GPP TS24.334. However, 3GPP TR 22.803 merely discusses use cases of the ProSe restricted discovery, and the 3GPP TS 24.334 describes the ProSe open discovery between the UE and the ProSe function room.

Figure 4:
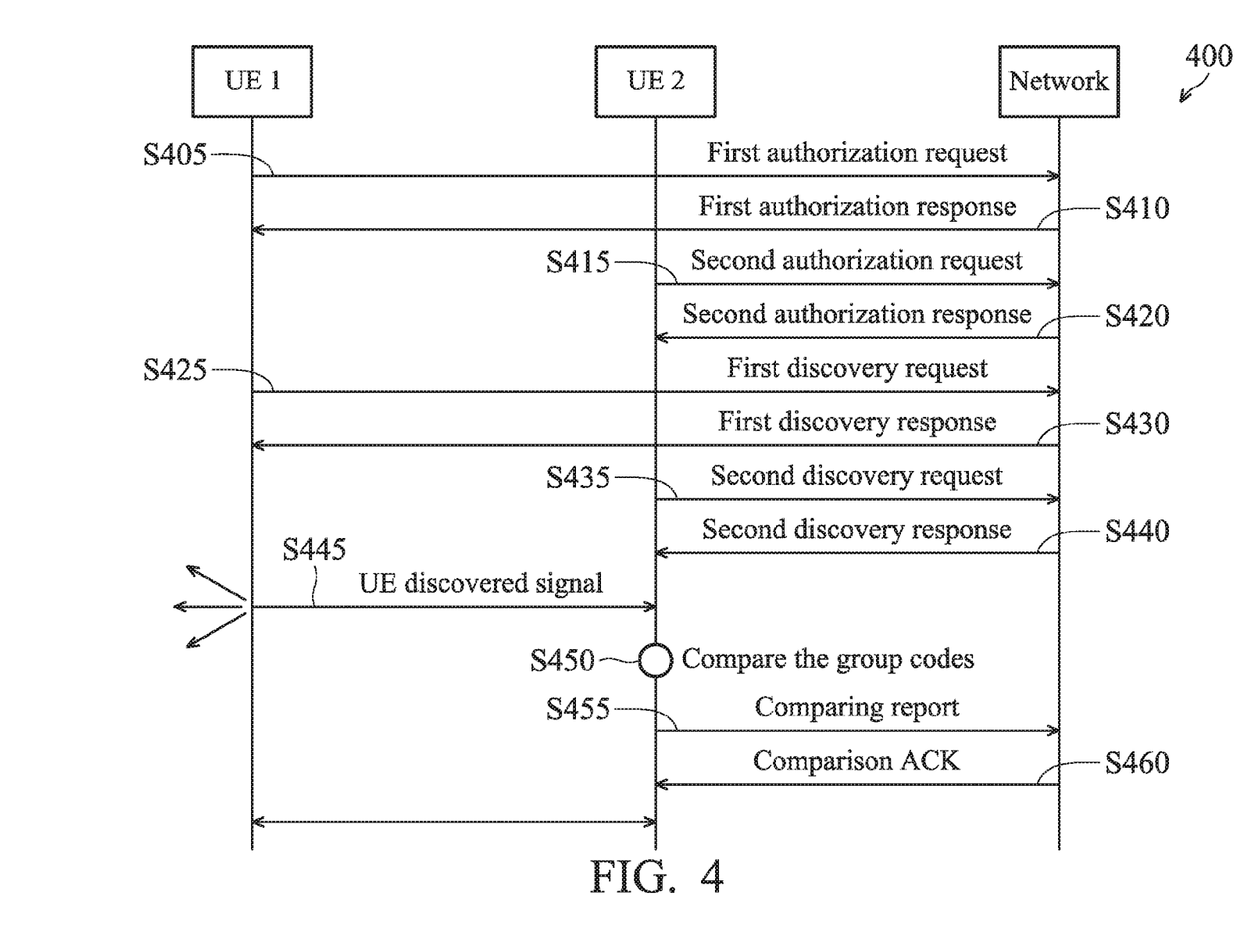
FIG. 4 is a message flow illustrating that a grouping procedure is performed between the UEs in proximity services restricted discovery according to an embodiment of the present invention.

FIG. 4 is a message flow 400 illustrating that a grouping procedure is performed between the UEs in proximity services restricted discovery according to an embodiment of the present invention. First, in step S405 and S415, the first UE (UE 1) and the second UE (UE 2) transmit a first authorization request and a second authorization request to the network, respectively, to request to use the proximity services restricted discovery of groups. After receiving the first authorization request and the second authorization request, in step S410 and S420, the network transmits a first authorization response and a second authorization response to the first UE and the second UE, respectively.

The first authorization response and the second authorization response transmitted by the network in FIG. 4 comprises the following group parameters:

ProSe Layer-2 Group ID;
Groups IP multicast address;
address type (IPv4 or IPv6);
Source IPv4 address;
Group-related security contents.

It should be noted that, in the embodiment, it is assumed that the first UE is an announcing UE, and the second UE is a monitoring UE. Therefore, back to FIG. 4, in step S425, the first UE transmits a first discovery request to the network to request for discovery, wherein the first discovery request includes a group ID obtained in step S410. In step S430, the network transmits a first discovery response to the UE according to the group ID, wherein the first discovery response comprises a first group code and information of a discovery type "restricted discovery".

Similarly, in step S435, the second UE transmits a second discovery request to the network to request for discovery, wherein the second discovery request includes the group ID obtained in step S420. In step S440, the network transmits a second discovery response to the second UE, wherein the second discovery response comprises a second group code.

In step S445, the first UE broadcasts a UE discovered signal for being discovered, wherein the UE discovered signal at least includes a first group code. In step S450, after receiving the UE discovered signal from the first UE, the second UE compares the first group code with the second group code. When the second UE determines that the first group code and the second group code are the same (it means that the first UE and the second UE belongs to the same group), in step S455, the second UE transmits a comparing report to the network to notify the network that the first UE and the second UE belongs to the same group, wherein the comparing report at least includes the first group code and the second group code. In step S460, the network transmits a comparison acknowledgement (ACK) to confirm that the first UE and the second UE are in the same group. Therefore, the first UE and the second UE can communicate with each other directly after being in the same group.

Figure 5:
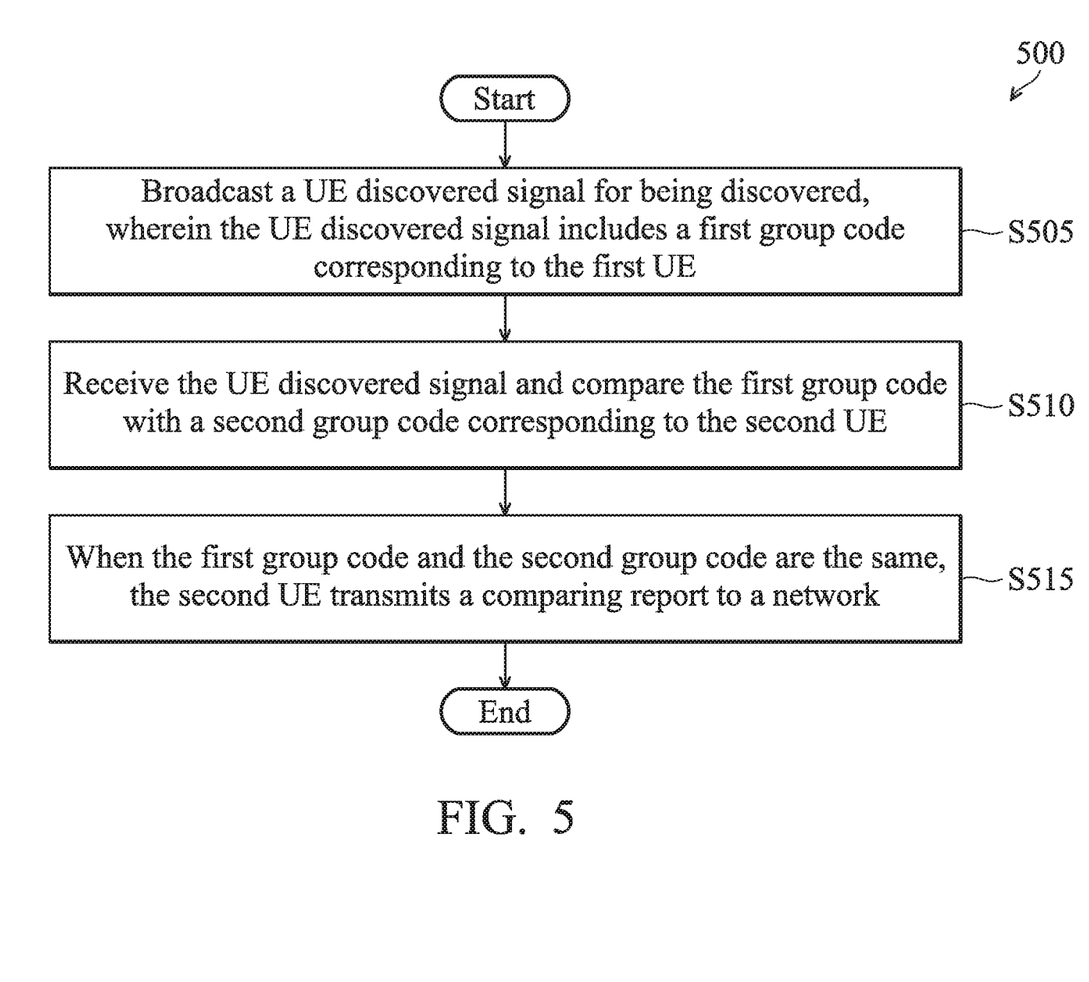
FIG. 5 is a flow chart illustrating a method for grouping the UEs in proximity services restricted discovery according to an embodiment of the invention.

FIG. 5 is a flow chart 500 illustrating a method for grouping the UEs in proximity services restricted discovery according to an embodiment of the invention with reference to FIG. 1. The method is used in a communications system. In step S505, a first UE broadcasts a UE discovered signal for being discovered, wherein the UE discovered signal includes a first group code corresponding to the first UE. Next, in step S510, a second UE receives the UE discovered signal and compares the first group code with a second group code corresponding to the second UE. In step S515, when the first group code and the second group code are the same, the second UE transmits a comparing report to a network.

Figure 6:
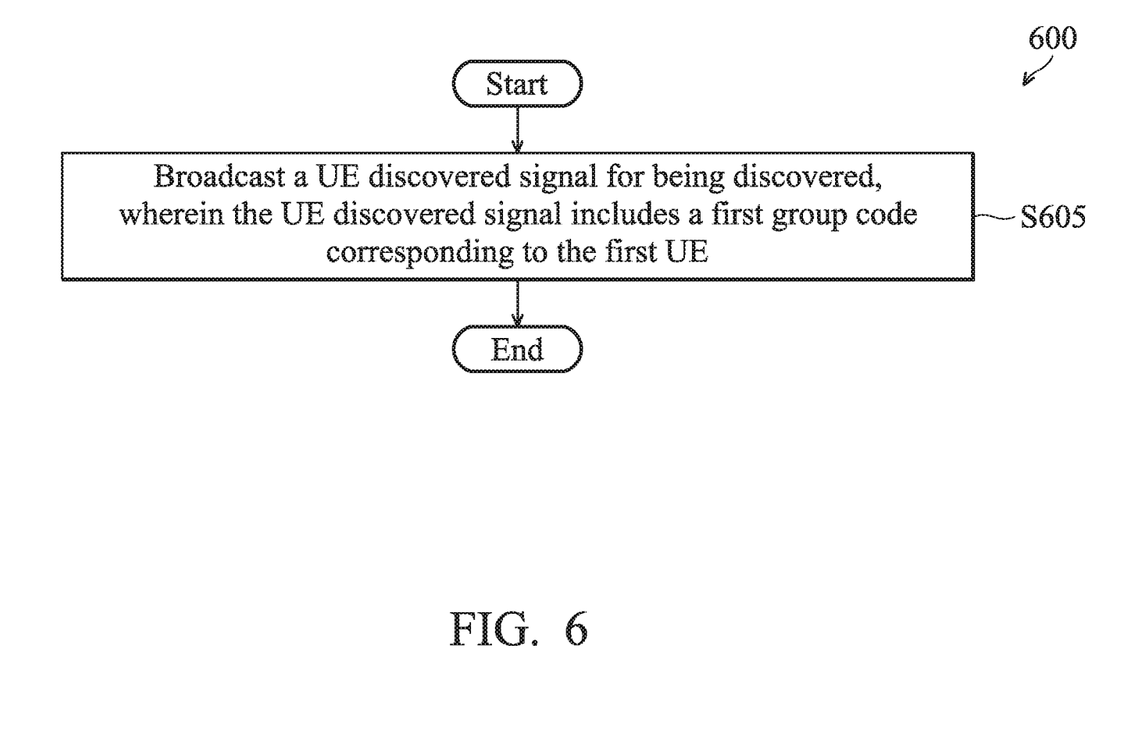
FIG. 6 is a flow chart illustrating a method for grouping the UEs in proximity services restricted discovery according to an embodiment of the invention.

FIG. 6 is a flow chart 600 illustrating a method for grouping the UEs in proximity services restricted discovery according to an embodiment of the invention with reference to FIG. 4. The method is used in a first user equipment (UE). In step S605, the first UE broadcasts a UE discovered signal for being discovered, wherein the UE discovered signal includes a first group code corresponding to the first UE. In an embodiment, before broadcasting the UE discovered signal, the first UE transmits a first discovery request to the network, wherein the first discovery request includes a group ID. Next, the first UE receives a first discovery response transmitted from the network which transmits the first discovery response according to the first discovery request, wherein the first discovery response includes the first group code and information of a discovery type "restricted discovery".

Figure 7:
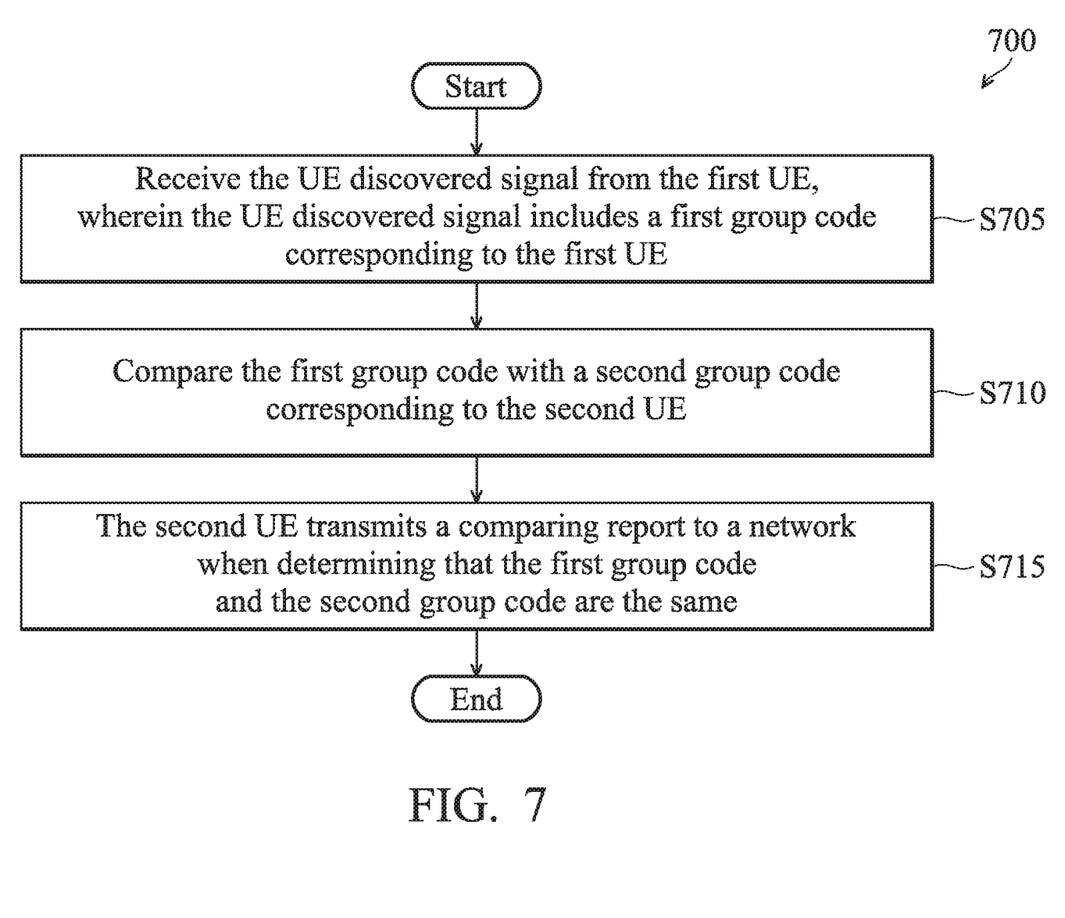
FIG. 7 is a flow chart illustrating a method for grouping the UEs in proximity services restricted discovery according to an embodiment of the invention.

FIG. 7 is a flow chart 700 illustrating a method for grouping the UEs in proximity services restricted discovery according to an embodiment of the invention with reference to FIG. 4. The method is used in a second user equipment (UE). In step S705, the second UE receives the UE discovered signal from the first UE, wherein the UE discovered signal includes a first group code corresponding to the first UE. In step S710, the second UE compares the first group code with a second group code corresponding to the second UE. In step S715, when the second UE determines that the first group code and the second group code are the same, the second UE transmits a comparing report to a network, wherein the comparing report includes the first group code and the second group code. In an embodiment, before receiving the UE discovered signal, the second UE transmits a second discovery request to the network, and receives a second discovery response transmitted from the network which transmits the second discovery response according to the second discovery request, wherein the second discovery request includes a group ID, and the second discovery response includes the second group code. In another embodiment, after transmitting the comparing report to the network, the second UE receives a comparison acknowledgement (ACK) transmitted from the network, and communicates with the first UE directly.

Figure 8:
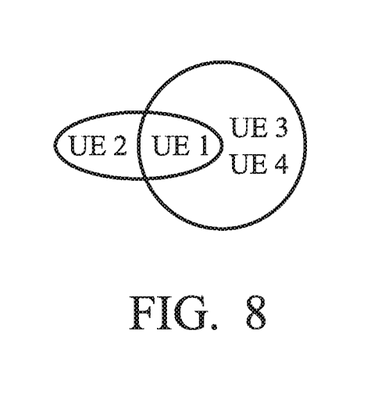
FIG. 8 is a schematic diagram illustrating that the UEs are grouped into different groups in proximity services restricted discovery according to an embodiment of the invention.

Therefore, as shown above, the UEs can be grouped into different groups via the methods described above. In one embodiment, the UE may belong to different groups at the same time, as shown in FIG. 8. The first UE (UE 1) can belong to Group I with the second UE (UE 2). The first UE (UE 1) can also belong to Group II with a third UE (UE 3) and a fourth UE (UE 4). Through the comparing report returned by the UEs, the network can record the group relationships of the UEs, as shown in Table 1. In addition, the network can also record the group ID and group codes of each UE, as shown in Tables 2-5.

TABLE 1

| Group ID | Group Code | Group Member |
|---|---|---|
| Group ID I | Group Code 1 | UE 1, UE 2 |
| Group ID II | Group Code 2 | UE 1, UE 3, UE 4 |
| ... | ... | ... |

TABLE 2

| UE 1 | |
|---|---|
| Group ID | Group Code |
| Group ID I | Group Code 1 |
| Group ID II | Group Code 2 |

TABLE 3

| UE 2 | |
|---|---|
| Group ID | Group Code |
| Group ID I | Group Code 1 |

TABLE 4

| UE 3 | |
|---|---|
| Group ID | Group Code |
| Group ID II | Group Code 2 |

TABLE 5

| UE 4 | |
|---|---|
| Group ID | Group Code |
| Group ID II | Group Code 2 |

Figure 9:
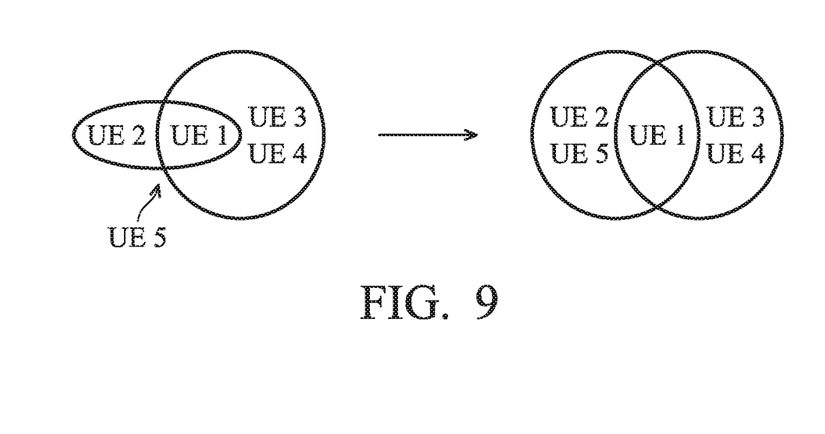
FIG. 9 is a schematic diagram illustrating that a fifth UE is joined into the groups by a first UE according to an embodiment of the invention.
Figure 10:
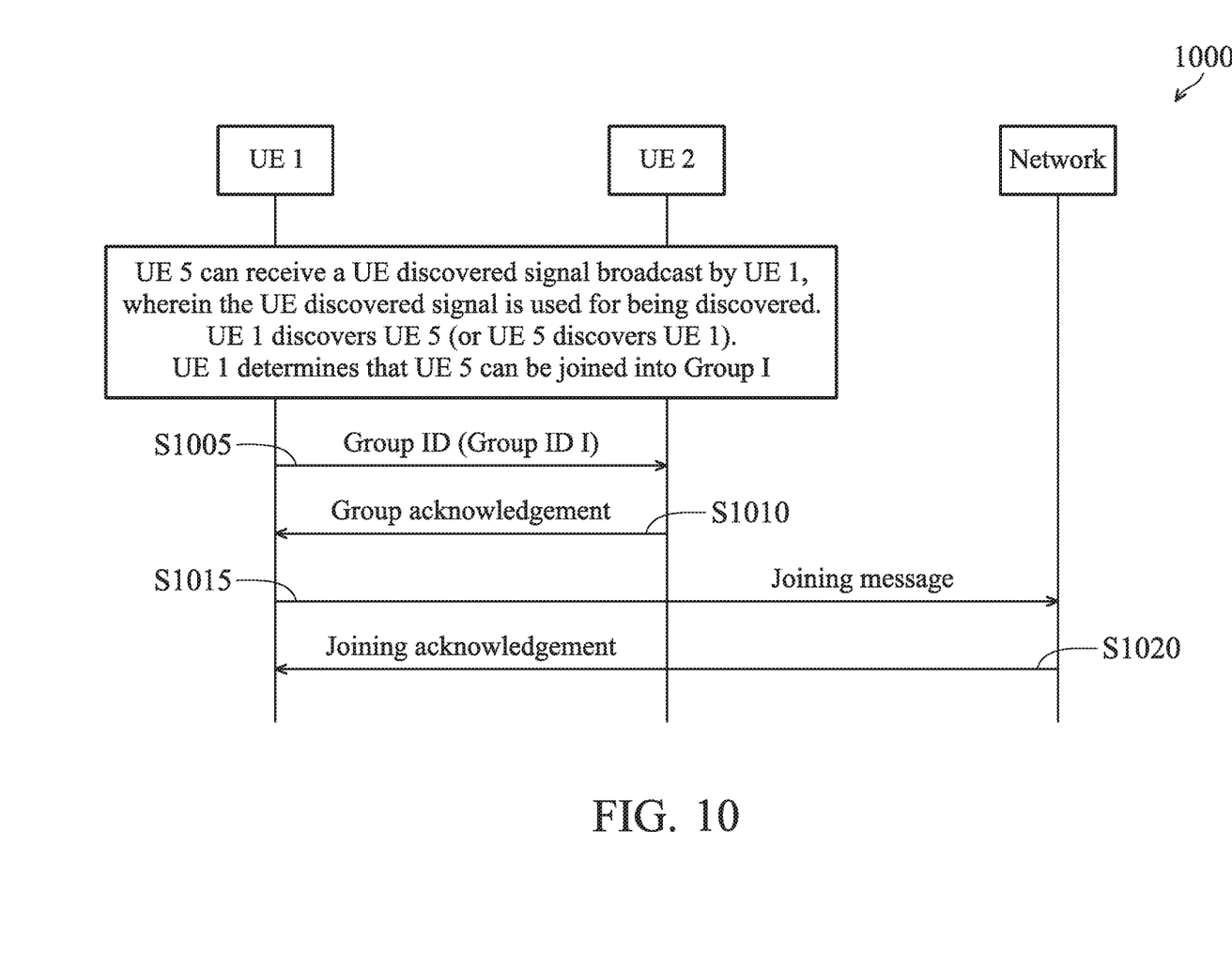
FIG. 10 is a message flow illustrating that a UE is joined into the groups in proximity services restricted discovery according to an embodiment of the present invention.

In one embodiment, a fifth UE can be joined into the groups by the first UE in FIG. 8, and the first UE may decide which groups the fifth UE belongs to, as shown in FIG. 9. FIG. 10 is a message flow 1000 illustrating that a UE is joined into the groups in proximity services restricted discovery according to an embodiment of the present invention. First, a fifth UE (UE 5) can receive a UE discovered signal broadcast by the first UE (UE 1), wherein the UE discovered signal is used for being discovered. The first UE discovers the fifth UE. In another embodiment, the first UE can be found by the fifth UE. The first UE determines that the fifth UE can be joined into Group I. In step S1005, the first UE transmits a group ID (Group ID I) to the fifth UE. In step S1010, the fifth UE transmits a group acknowledgement to the first UE. In step S1015, the first UE transmits a joining message to the network, wherein the joining message includes the fifth UE and the group ID (Group ID I) of the fifth UE. In step S1020, the network retransmits a joining acknowledgement to the first UE to confirm that the fifth UE has been joined into the Group I.

Through the joining message transmitted by the first UE, the network can update the group relationships of the UEs, as shown in Table 6. In addition, the network can also update the group ID and the group code of the fifth UE, as shown in Table 7.

TABLE 6

| Group ID | Group Code | Group Member |
|---|---|---|
| Group ID I | Group Code 1 | UE 1, UE 2, UE 5 |
| Group ID II | Group Code 2 | UE 1, UE 3, UE 4 |
| ... | ... | ... |

TABLE 7

| UE 5 | |
|---|---|
| Group ID | Group Code |
| Group ID I | Group Code 1 |

In addition, the central processing unit 208 can execute the program code 212 to perform all of the above-described actions and steps or others described herein.

Therefore, the UEs can be grouped into different groups in the communications system of FIG. 1 by using the method for grouping in proximity services restricted discovery. The network can perform management by the UEs grouped into the different groups, so that the efficiency of processing data transmission and other applications can be improved further.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for grouping user equipments (UEs) in proximity services restricted discovery, used in a communications system, comprising:
    transmitting a first discovery request to a network, wherein the first discovery request includes a group ID;
    receiving a first discovery response transmitted from the network which transmits the first discovery response according to the first discovery request, wherein the first discovery response includes a first group code;
    transmitting a second discovery request to the network, wherein the second discovery request includes a group ID;
    receiving a second discovery response transmitted from the network which transmits the second discovery response according to the second discovery request, wherein the second discovery response includes a second group code;
    broadcasting, by a first user equipment (UE), a UE discovered signal for being discovered, wherein the UE discovered signal includes the first group code corresponding to the first UE;
    receiving, by a second UE, the UE discovered signal and comparing the first group code with the second group code corresponding to the second UE;
    transmitting, by the second UE, a comparing report to the network when the first group code and the second group code are the same;
    in response to the comparing report, transmitting by the network a comparison acknowledgment, which comparison acknowledgment includes information that confirms the first UE and the second UE are in the same group; and
    in response to receiving the comparison acknowledgment and the information, instituting direct communications between the first UE and second UE.

2. The method for grouping UEs in proximity services restricted discovery as claimed in claim 1, further comprising:
    receiving, by the second UE, the comparison acknowledgement (ACK) transmitted from the network; and
    wherein the comparing report includes the first group code and the second group code.

3. The method for grouping UEs in proximity services restricted discovery as claimed in claim 1, before transmitting the first discovery request by the first UE, further comprising:
    transmitting a first authorization request to the network; and receiving a first authorization response transmitted by the network which transmits the first authorization response according to the first authorization request, wherein the first authorization response includes the group ID.

4. The method for grouping UEs in proximity services restricted discovery as claimed in claim 1, before transmitting the second discovery request by the second UE, further comprising:

transmitting a second authorization request to the network; and receiving a second authorization response transmitted by the network which transmits the second authorization response according to the second authorization request, wherein the second authorization response includes the group ID.

5. A communications system for grouping user equipments (UEs) in proximity services restricted discovery, comprising:

a network device;

a first user equipment (UE), transmits a first discovery request to the network and receives a first discovery response transmitted from the network which transmits the first discovery response according to the first discovery request, wherein the first discovery request includes a group ID, and the first discovery response includes a first group code;

a second UE transmits a second discovery request to the network and receives a second discovery response transmitted from the network which transmits the second discovery response according to the second discovery request, wherein the second discovery request includes a group ID, and the second discovery response includes a second group code;

after receiving the first discovery response, the first UE broadcasts a UE discovered signal for being discovered, wherein the UE discovered signal includes the first group code corresponding to the first UE;

the second UE, receives the UE discovered signal from the first UE, wherein the second UE compares the first group code with the second group code corresponding to the second UE, and transmits a comparing report to the network when the first group code and the second group code are the same;

wherein the network device, which is remote from both the first UE and second UE, is configured to transmit a comparison acknowledgment, which comparison acknowledgment includes information that confirms that the first UE and the second UE are in the same group; and wherein the first UE and the second UE are configured to institute direct communications between the first UE and second UE, in response to receiving the comparison acknowledgment and the information.

6. The communications system for grouping UEs in proximity services restricted discovery as claimed in claim 5, wherein after transmitting the comparing report to the network, the second UE receives a comparison acknowledgement (ACK) transmitted from the network and communicates with the first UE directly, wherein the comparing report includes the first group code and the second group code.

7. The communications system for grouping UEs in proximity services restricted discovery as claimed in claim 5, wherein before transmitting the first discovery request, the first UE transmits a first authorization request to the network, and receives a first authorization response transmitted by the network which transmits the first authorization response according to the first authorization request, wherein the first authorization response includes the group ID.

8. The communications system for grouping UEs in proximity services restricted discovery as claimed in claim 5, wherein before transmitting the second discovery request, the second UE transmits a second authorization request to the network, and receives a second authorization response transmitted by the network which transmits the second authorization response according to the second authorization request, wherein the second authorization response includes the group ID.

9. A method for grouping user equipments (UEs) in proximity services restricted discovery, used in a second UE, comprising:

transmitting a discovery request to a network, wherein the discovery request includes a group ID; and receiving a discovery response transmitted from the network which transmits the discovery response according to the discovery request, wherein the discovery response includes a second group code;

receiving a UE discovered signal for being discovered, wherein the UE discovered signal includes a first group code corresponding to a first UE;

comparing the first group code with the second group code corresponding to the second UE;

transmitting a comparing report to a network when the first group code and the second group code are the same;

receiving a comparison acknowledgment transmitted by the network, which comparison acknowledgment includes information that confirms that the first UE and the second UE are in the same group; and in response to receiving the comparison acknowledgment and the information, instituting direct communications with the first UE.

10. The method for grouping UEs in proximity services restricted discovery as claimed in claim 9, before transmitting the second discovery request, further comprising:

transmitting a second authorization request to the network; and receiving a second authorization response transmitted by the network which transmits the second authorization response according to the second authorization request, wherein the second authorization response includes the group ID.

* * * * *